Sept. 6, 1938.  F. KURZ  2,129,010

POLYPHASE WATT-HOUR METER CONSTRUCTION

Filed April 12, 1937  2 Sheets-Sheet 1

Inventor:
Fred Kurz
By: Brown, Jackson, Boettcher & Dienner.
Attys.

Sept. 6, 1938.  F. KURZ  2,129,010
POLYPHASE WATT-HOUR METER CONSTRUCTION
Filed April 12, 1937  2 Sheets-Sheet 2
Fig. 6.
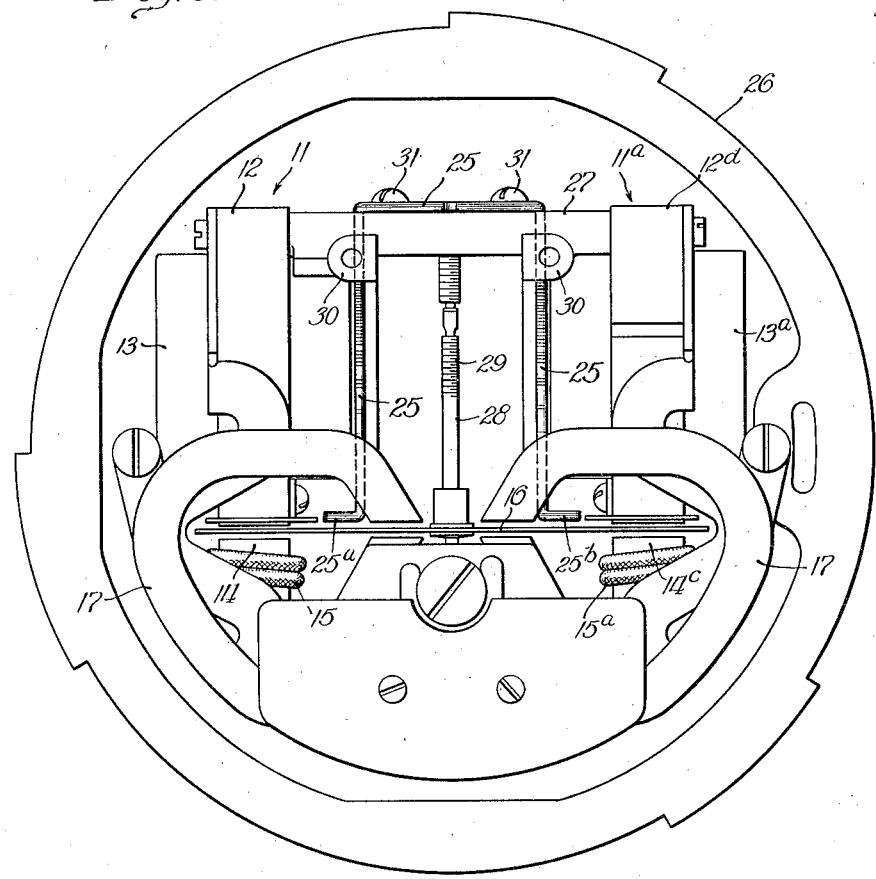
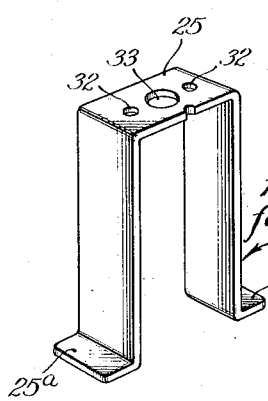
Fig. 7.
high permeability magnetic bridge
for neutralizing stray magnetic flux.
Inventor:
Fred Kurz
By: Brown, Jackson, Boettcher & Dienner
Attys.

Patented Sept. 6, 1938

2,129,010

UNITED STATES PATENT OFFICE 2,129,010

POLYPHASE WATT-HOUR METER CONSTRUCTION

Fred Kurz, Springfield, Ill., assignor to Sangamo Electric Company, Springfield, Ill., a corporation of Illinois Application April 12, 1937, Serial No. 136,337

6 Claims. (Cl. 171—264)

My invention relates, generally, to electric measuring devices, and it has particular relation to polyphase watthour meters.

It has been customary to construct alternating current polyphase watthour meters with a plurality of discs mounted on a common shaft and each disc having a watthour meter unit individual thereto for applying a driving torque. The resultant torque that is applied to the common shaft connecting the discs is equal to the sum of the torques individually applied by the watthour meter units. By this means it is possible to drive a register which will indicate the total energy that has been consumed in the circuits in which the watthour meter units are connected. Since these watthour meter units cooperate with individual discs, and, further, since they may be so mounted that there will be substantially no magnetic interaction therebetween, the torque that is applied to the shaft is the result solely of the torques individually applied by the several discs, and there is no additional torque applied by interaction between the various watthour meter units.

It has also been customary to construct polyphase watthour meters for measuring alternating current in which a plurality of watthour meter units are arranged to cooperate with a single disc. It is intended that each of the units shall apply a torque to the disc which shall be a function of the power flowing in the circuit to which it is connected.

Because of the relatively close proximity of the watthour meter units in the single disc type of watthour meter and the fact that they both cooperate with the same disc, errors in registration may result which might not be present when the two disc type of construction is employed. These errors in registration are caused by the reaction between the watthour meter units and the disc in such manner that the net torque applied to drive it is proportional not only to the sum of the individual torques caused by each watthour meter unit, but it also is proportional to some function involving the product of the individual torques.

Therefore, the principal object of my invention is to apply torque to a single disc of a watthour meter by a plurality of watthour meter units in such manner that the torque shall be proportional solely to the sum of the independent torques generated by each unit.

An important object of my invention is to neutralize the reaction between the stray magnetic fluxes of each of two watthour meter units acting on a single disc and the eddy currents generated therein by the other unit, so that the resultant torque applied to the disc will be substantially the sum of the torques generated by each unit.

An object of my invention is to provide a high permeability magnetic bridge between the cores of a pair of watthour meter units acting on a single disc to neutralize the stray magnetic fluxes generated by each unit in such manner that they do not react with the eddy currents generated in the disc by the other unit.

Other objects of my invention will in part be obvious and in part appear hereinafter.

Accordingly, my invention is disclosed in the embodiment hereof shown in the accompanying drawings, and it comprises the features of construction, combination of elements and arrangement of parts that will be exemplified in the following detailed description and the scope of the application of which will be indicated in the appended claims.

For a more complete understanding of the nature and scope of my invention, reference may be had to the following detailed description taken in connection with the accompanying drawings, in which:

Figure 6 is a view, in front elevation, of a two unit watthour meter embodying the features of my invention, the cover and register having been omitted in order to more clearly illustrate the invention; and Figure 7 is a perspective view of the magnetic bridging member that is employed in practicing my invention.

Figure 1:
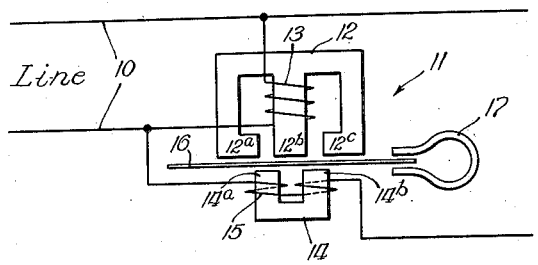
Figure 1 illustrates, diagrammatically, the construction and connections of a single phase alternating current watthour meter.

In order to more clearly demonstrate the novel features of my invention and to point out the features which I believe underlie it, reference will first be had to the functioning of a single phase watthour meter in which a single watthour meter unit cooperates with a disc to apply torque thereto for measuring the energy that has flowed in a circuit. Referring now particularly to Figure 1 of the drawings, it will be observed that the reference character 10 designates an alternating current circuit, the flow of energy in which is to be measured by a watthour meter that is shown generally at 11. The meter 11 comprises an E-shaped core formed of laminations, on the central leg of which is positioned a voltage coil 13 that is connected across the conductors 10. Underneath the core 12 is a C-shaped core 14 that is also formed of laminations of magnetic material, and it has wound on its legs a pair of current coils 15 through which the current in the conductors 10 flows. In the air gap formed between the pole tips 12a, 12b and 12c of the core 12 and the pole tips 14a and 14b of the core 14, a disc 16 is rotatably mounted and is arranged to have applied thereto a torque that is dependent upon the power in the circuit represented by the conductors 10, as will be readily understood. A permanent magnet 17 is provided for damping the movement of the disc 16 in the usual manner.

Figure 2:
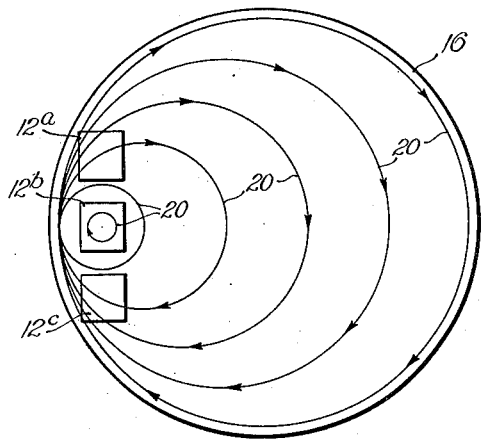
Figure 2 illustrates, diagrammatically, the eddy currents that are generated in the disc by the voltage element of the single phase watthour meter unit.

In Figure 2 of the drawings I have illustrated by the curved lines 20 and the arrow heads thereon the direction of flow of eddy currents in the disc 16 as caused by the flux flowing between the pole tips 12a, 12b and 12c that is generated by the voltage winding 13. The eddy currents in the disc 16 underneath the pole tips 12a, 12b and 12c react with the flux generated by the current winding 15, in accordance with Lenz' law, to produce the necessary torque for rotating the disc 16.

The eddy currents that are generated in the disc 16 by the flux flowing between the pole tips 14a and 14b are indicated by the curved lines 21 and the arrow heads thereon. These eddy currents underneath the pole tips 14a and 14b react with the flux generated by the voltage winding 13 for the purpose of also producing torque for rotating the disc 16.

Figure 3:
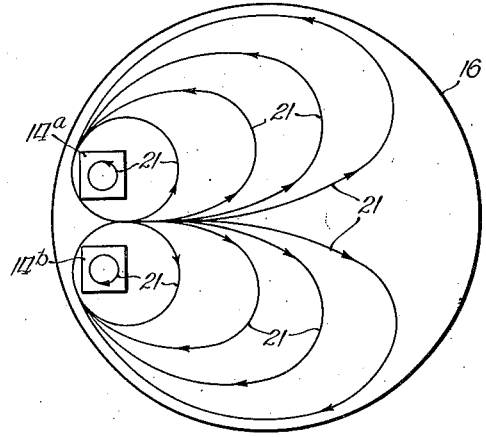
Figure 3 illustrates, diagrammatically, the eddy currents that are generated in the disc by the current element of a single phase watthour meter unit.

It will be observed that the eddy currents represented by the lines 20 and 21 in Figures 2 and 3 are not confined to the region underneath the pole tips of the cores 12 and 14 but, rather, that they spread to the remote regions of the disc 16. It will also be observed that the directions of flow of the eddy currents are not circumferential, but that these directions may be resolved into radial and tangential components. In these same regions remote from the cores 12 and 14, there simultaneously exist stray magnetic fields that are generated by the voltage and current windings 13 and 15. These stray magnetic fields may be separated into components that are either perpendicular, tangential, or radial with respect to the axis of rotation of the disc 16. The reaction between the perpendicular components of these magnetic fields and the radial components of the eddy currents gives rise to forces that tend to produce rotation of the disc 16. In a watthour meter in which a single unit is employed and reacts with a single disc, these forces go to make up the meter characteristics, and they can be readily determined for any particular set of conditions. However, when two or more watthour meter units are arranged to drive the disc 16, other factors are involved which cannot so readily be determined.

Figure 4:
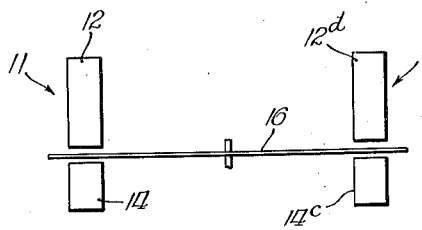
Figure 4 illustrates, diagrammatically, the arrangement of two watthour meter units arranged to drive a single disc.

In Figure 4 of the drawings I have illustrated diagrammatically the arrangement of two watthour meter units 11 and 11a for applying torque to a single disc 16. Under any assumed value and phase of current and voltage applied to the unit 11, the torque that is produced by this unit is to some extent influenced by the presence of the unit 11a which may be assumed to be excited in some arbitrary manner or to be energized from another phase of a polyphase circuit. This effect is caused by certain components of the magnetic fields from these units that interact with radial components of the eddy currents generated by the unit 11. A similar relation exists with respect to the torque that is produced by the unit 11a. Thus each of the units 11 and 11a produces both eddy currents and magnetic fields in remote portions of the disc therefrom, and these various fields and eddy currents may interact to produce torque that is effective to change the registration of the meter as a whole in a rather complex manner. Stated differently, the resultant torque of the meter under these conditions is equal not only to the sum of the individual torques caused by each of the units 11 and 11a, but is also equal to this sum plus some function involving the product of these two torques. In the desired type of meter, the construction is such that the torque applied to the disc 16 will be the result only of the sum of the two torques generated by the units 11 and 11a, and it is independent of a third term that involves a function of the product of these two torques.

This desired result is obtained when the meter is so constructed that each of the watthour meter units reacts only with a single disc, as described hereinbefore. In such a construction the discs are suitably mechanically coupled together, as by being mounted on a common shaft, but the units themselves are completely shielded from each other electromagnetically. Moreover, this construction is provided only at the expense of size and weight, as well as cost.

When the two units are arranged to apply torque to a single disc—for example the disc 16—,there is a considerable reduction in size and weight of the meter, and the cost is likewise reduced. However, provision must be made for compensating for the torque that is applied to the disc 16 because of the interaction between the two watthour meter units 11 and 11a, for example. This compensation takes the form of the provision of means for reducing the vertical component of the stray magnetic fields in the remote regions of the disc 16 where they may interact with radial components of the eddy currents of the other unit.

Figure 5:
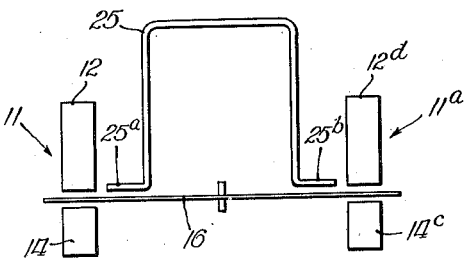
Figure 5 is a view diagrammatically illustrating how my invention may be applied to the construction shown in Figure 4 for reducing interaction between the two watthour meter units.

The reduction of the vertical components of the stray fields in the remote regions of the disc 16 is effected by means of an inverted U-shaped bridging member 25 that is shown diagrammatically in Figure 5 of the drawings. As there illustrated, the bridging member 25 is provided with out-turned end portions 25a and 25b that are disposed adjacent the voltage units of the watthour meter elements 11 and 11a.

The manner in which the bridging member 25 may be incorporated in a commercial type of polyphase watthour meter is shown in Figure 6 of the drawings, while the preferred form of the bridging member 25 is illustrated in detail in Figure 7. As shown in Figure 6, the polyphase watthour meter is provided with a base 26 on which is mounted a frame member 27 that is formed of non-magnetic material, such as aluminum or an aluminum alloy. The disc 16 is rotatably mounted on the frame member 27 on a shaft 28 that is provided with a threaded portion 29 for driving a register (not shown) that is mounted on suitable ears or bosses 30 that may be integrally formed with the frame member 27. The bridging member 25 is secured in position on top of the frame member 27 by any suitable means, such as the screws 31 that project through clearance holes 32 in the flat common portion between the vertical branches of the U-shaped bridging member 25, as shown in Figure 7. An enlarged clearance hole 33 is also provided in this portion to permit adjustment of the upper bearing of the shaft 28.

In this construction, two permanent magnets 17 are mounted on the frame member 27 and serve to damp the rotation of the disc 16.

It will be observed that the watthour meter units 11 and 11a are mounted on opposite sides of the frame member 27, and in this position they are diametrically disposed on opposite sides of the disc 16. The cores 12 and 14 of the element 11, and 12d and 14c of the element 11a, are positioned at right angles to the disc 16. These cores are excited, respectively, by voltage and current windings 13 and 15 and 13a and 15a. The vertical branches of the inverted U-shaped bridging member 25 are disposed parallel to the cores 12 and 12d, as shown, while the lower outturned ends 25a and 25b extend toward them adjacent the upper surface of the disc 16. The bridging member 25 is formed preferably of high permeability material in order to provide the desired neutralizing effect. Its width throughout its entire length is sufficient to prevent the vertical components of the stray magnetic field of either of the units 11 or 11a from reacting with local radial components of eddy currents from the other unit and producing an undesired torque in the disc 16. In effect, the bridging member 25 serves to guide the stray fields from one unit to the other over such a path that they do not react with eddy currents generated in the disc by the other unit, and, as a result, no additional rotational torque in the disc 16 is present.

While the principles underlying the operation of my invention as hereinbefore outlined may not be correct in their entirety, I wish to point out that the bridging member 25 constructed and applied as herein disclosed is effective to reduce to a minimum, if not to altogether eliminate, any interaction between the two watthour meter units 11 and 11a that are arranged to apply torque to a single disc 16. Since certain changes may be made in the foregoing construction and different embodiments of the invention may be made without departing from the scope thereof, it is understood that the construction shown in the accompanying drawings and described hereinbefore shall be interpreted as illustrative and not in a limiting sense.

I claim as my invention:

1. In a polyphase induction watthour meter, in combination, a rotatable disc, a plurality of induction watthour meter units cooperating with said disc for applying torque thereto, and means magnetically bridging between said units in such manner that the torque applied to said disc by the interaction of said units is substantially reduced.

2. In a polyphase induction watthour meter, in combination, a rotatable disc, a pair of induction watthour meter units mounted on opposite sides of said disc for applying torque thereto, and a magnetic bridge member disposed between the cores of said units whereby the torque applied to said disc by interaction of said units is substantially reduced.

3. In a polyphase induction watthour meter, in combination, a rotatable disc, a pair of induction watthour meter units mounted on opposite sides of said disc for applying torque thereto, and a bridge member formed of high permeability metal disposed between the cores of said elements in such manner as to reduce the effects of the components of stray magnetic flux of each unit at right angles to said disc in reacting with eddy currents generated in said disc by the other unit whereby the torque applied to said disc is substantially the result of said units acting individually.

4. In a polyphase induction watthour meter, in combination, a rotatable disc, a pair of induction watthour meter units, non-magnetic frame means mounting said units on opposite sides of said disc for applying torque thereto, and a magnetic bridge member carried by said non-magnetic frame means with its ends adjacent said disc and the cores of said units for neutralizing the reactions between the magnetic flux of each unit and the eddy currents generated in said disc by the other unit.

5. In a polyphase induction watthour meter, in combination, a rotatable disc; a pair of induction watthour meter units mounted on opposite sides of said disc for applying torque thereto, each of said units including voltage and current elements having magnetic cores disposed at right angles to said disc; and an inverted U-shaped magnetic bridge member mounted between said voltage elements with the branches thereof being disposed substantially parallel to the cores of said voltage elements and the ends thereof being disposed in proximity to said disc for neutralizing the reactions between the stray magnetic flux of each unit and the eddy currents generated in said disc by the other unit whereby the torque applied to said disc is substantially the result of said units acting individually.

6. In a polyphase induction watthour meter, in combination, a non-magnetic frame, a disc rotatably mounted on said frame; a pair of induction watthour meter units carried by said frame on opposite sides of said disc for applying torque thereto, each of said units including voltage and current elements having magnetic cores disposed at right angles to said disc; and an inverted U-shaped bridge member formed of high permeability metal carried by said frame between said units with the branches thereof being disposed substantially parallel to the cores of said voltage elements and the ends thereof being disposed in proximity to said disc and turned outwardly toward said cores whereby the torque applied to said disc is substantially the result of said units acting individually.

FRED KURZ.